United States Patent
Strawczynski et al.

(10) Patent No.: US 7,457,538 B2
(45) Date of Patent: Nov. 25, 2008

(54) DIGITAL PERFORMANCE MONITORING FOR AN OPTICAL COMMUNICATIONS SYSTEM

(75) Inventors: Leo Strawczynski, Ottawa (CA); Kim B. Roberts, Nepean (CA)

(73) Assignee: Nortel Networks Limited, St, Laurent, Quebec (CA)

( * ) Notice: Subject to any disclaimer, the term of this patent is extended or adjusted under 35 U.S.C. 154(b) by 671 days.

(21) Appl. No.: 10/145,035

(22) Filed: May 15, 2002

(65) Prior Publication Data

US 2004/0213338 A1    Oct. 28, 2004

(51) Int. Cl.
*H04B 10/08* (2006.01)
(52) U.S. Cl. .............................. 398/33; 398/25; 398/189
(58) Field of Classification Search .................... 398/33, 398/9–30, 37–38, 202–214, 189
See application file for complete search history.

(56) References Cited

U.S. PATENT DOCUMENTS

| | | | |
|---|---|---|---|
| 5,513,029 A | 4/1996 | Roberts | 359/177 |
| 5,949,560 A | 9/1999 | Roberts et al. | 359/110 |
| 5,999,258 A | 12/1999 | Roberts | 356/345 |
| 6,031,644 A | 2/2000 | Utsumi | 359/110 |
| 6,075,814 A | 6/2000 | Yamano et al. | 375/222 |
| 6,128,111 A | 10/2000 | Roberts | 359/110 |
| 6,222,652 B1 | 4/2001 | Roberts | 359/110 |
| 6,252,692 B1 | 6/2001 | Roberts | 359/173 |
| 6,341,024 B1* | 1/2002 | Jeong | 398/87 |
| 6,754,415 B2* | 6/2004 | Shin et al. | 385/37 |
| 2002/0012152 A1* | 1/2002 | Agazzi et al. | 359/189 |
| 2002/0171485 A1* | 11/2002 | Cova | 330/149 |
| 2005/0078957 A1* | 4/2005 | Hendow | 398/33 |

* cited by examiner

*Primary Examiner*—Dzung D Tran
(74) *Attorney, Agent, or Firm*—Kent Daniels; Blake, Cassels & Graydon LLP

(57) ABSTRACT

A digital performance monitoring method and system for an optical communications system utilizes a channel monitor and a digital signal processor (DSP). The channel monitor is designed to monitor a respective channel signal of the optical communications system, and includes: a sample memory adapted to store sample data including a set of sequential N-bit (where $N \geq 1$) samples generated by an Analog-to-Digital (A/D) converter at a timing of a predetermined sample clock during a predetermined time interval; and a controller adapted to control storage of the sample data to the sample memory. The digital signal processor (DSP) is designed to calculate at least one performance parameter of the optical communications system based on the sample data.

23 Claims, 5 Drawing Sheets

DIGITAL PERFORMANCE MONITORING FOR AN OPTICAL COMMUNICATIONS SYSTEM

CROSS-REFERENCE TO RELATED APPLICATIONS

This is the first application filed for the present invention.

MICROFICHE APPENDIX

Not Applicable.

TECHNICAL FIELD

The present invention relates to performance monitoring systems, and in particular to a system for digital performance monitoring for an optical communications system.

BACKGROUND OF THE INVENTION

Optical communications networks are becoming increasingly popular for data transmission due to their high bandwidth data transmission. Typically, a digital data stream is encoded (e.g. using On-Off-Keying—OOK) to generate sequential symbols that are conveyed through a communications channel by a respective optical channel signal. At a receiving end of the communications channel, an Optical-to-Electrical (O/E) converter detects the received optical channel signal and generates a corresponding analog electrical channel signal. The O/E converter is followed by an Analog-to-Digital (A/D) converter, which generates sequential N-bit samples (where N is at least one, and typically between 4 and 8), each of which is indicative of the detected power of the received channel signal at a particular instant. As such, the samples generated by the A/D converter reflect the combined effects of the encoded symbol values, attenuation, noise and any other signal distortions affecting the channel signal during transmission through the communications network. Thus, at best, the samples generated by the A/D converter represent a corrupted version of the original symbol values.

Various known decoding strategies may be used to process the "raw" samples generated by the A/D converter to detect and decode the symbols conveyed by the channel signal, and thereby recover the original digital data stream. For example, a digital equalizer may be used to process the samples generated by the A/D converter, in order to reduce inter-symbol interference (ISI). A Forward Error Correction (FEC) circuit may then be used to process the equalizer output to determine and generate the correct value of each bit of the recovered digital data stream.

As the traffic on fiber optic networks increases, monitoring and management of the networks become increasingly important issues. To monitor the network, the spectral characteristics of the composite signal at particular points in the network must be determined and analyzed. This information may then be used to optimize the performance of the network.

Ideally, performance monitoring of an optical communications system should be based on the analysis of the actual optical signal waveform, across the entire range of wavelengths of interest. Spectral analysis of this type can be performed using a variety of known signal and spectrum analysis equipment. For example, optical signal analyzers are known for determining characteristics of an optical signal such as, for example, power level, extinction ratio, eye opening, signal-to-noise ratio, polarization dependent loss (PDL), dispersion etc. In order to monitor respective channels of a Wavelength Division Multiplexed (WDM) communications system, either multiple signal analyzers can be arranged in parallel, or a single signal analyzer can be sequentially tuned to receive each optical channel signal in turn. Optical Spectrum Analyzers (OSAs) can be used to determine average and peak power levels, as a function of wavelength, across any desired range of wavelengths. This data may be used to monitor distributed gain and Raman scattering effects within the wavelength band of interest.

Due to their cost and complexity, conventional optical signal and spectrum analysis equipment is typically restricted to laboratory use. In order to monitor performance of installed optical communications systems, simpler and less expensive monitoring equipment is required. Typically, this simplified equipment relies on a low frequency pilot tone (typically on the order of 1 MHz or less) that is imposed on the optical signal at a transmitter end of an optical fiber. The residual pilot tone can then be detected at a desired monitoring point, and compared with the known parameters of the original pilot tone to estimate a performance parameter of the optical communications system. Suitable detectors can be installed on each channel of a WDM communications system to enable calculation of performance parameter values across a wavelength band of interest. In some cases, processing of per channel measurements can be used to estimate inter-channel effects. In some advanced optical communications systems, simplified analog Optical Spectrum Analyzers (OSAs) can be used to measure optical power as a function of wavelength. OSAs of this type are typically used in conjunction with optical amplifiers, in order to facilitate control of pump laser power levels. Typical optical performance monitoring systems known in the art are disclosed in co-assigned U.S. Pat. Nos. 5,513,024; 5,949,560; 5,999,258; 6,128,111; 6,222,652; and 6,252,692.

While the above-described systems enable some degree of performance monitoring, they tend to suffer a number of disadvantages. In particular, per-channel monitoring systems are typically dependent on a low frequency pilot tone (or dither) having known parameters. Any error between the design and actual parameter values of the launched pilot tone will naturally degrade the accuracy of any performance parameters calculated at the monitoring point. Additionally, this approach assumes that performance parameters calculated on the basis of the low frequency pilot tone will be valid for the high-speed data traffic. Consequently, any frequency-dependent effects cannot be detected (or compensated) with this arrangement. Finally, the detectors and signal processors utilized in these monitoring systems are low frequency analog devices. This facilitates real-time calculation of performance parameters using low cost devices. However, this is obtained at a cost of versatility, and limits the scope of analysis applied to measured optical signal parameters.

Accordingly, a method and system that enables efficient performance monitoring of an optical communications system remains highly desirable.

SUMMARY OF THE INVENTION

An object of the present invention is to provide a method and system that enables efficient performance monitoring of an optical communications system.

Thus an aspect of the present invention provides method of monitoring performance of an optical communications system having a data path including an Analog-to-Digital (A/D) converter operatively coupled to a data decoder for generating a recovered data stream corresponding to subscriber digital data encoded within a respective channel signal. According to the present invention, the data path is tapped to obtain sample data generated by the A/D converter within a predetermined time interval. The sample data comprises sequential N-bit samples (where $N \geq 1$) respectively indicative of a detected analog value of the channel signal. At least one performance parameter of the optical communications system is subsequently calculated based on the sample data.

A further aspect of the present invention provides a digital performance monitoring system for an optical communications system. The optical communications system has a data path including an Analog-to-Digital (A/D) converter operatively coupled to a data decoder for generating a recovered data stream corresponding to subscriber digital data encoded within a respective channel signal. The digital performance monitoring system comprises a channel monitor and a digital signal processor (DSP). The channel monitor is designed to tap the data path to obtain sample data generated by the A/D converter within a predetermined time interval. The sample data comprises sequential N-bit samples (where $N \geq 1$) respectively indicative of a detected analog value of the channel signal. The digital signal processor (DSP) is designed to calculate at least one performance parameter of the optical communications system based on the sample data.

In some embodiments, the channel monitor may also include a data memory for storing corrected data bits generated using the sample data, for example by a Forward Error Correction (FEC) circuit. The samples and corrected data bits are preferably correlated, so that a corrected data bit can be associated with each sample used to generate that bit.

In some embodiments, the storage of samples (and possibly corrected data bits) by each one of a plurality of parallel channel monitors is controlled such that the storage operation occurs simultaneously. This arrangement allows highly accurate correlation of sample data across multiple channels, and thus detection of various cross-channel effects (such as cross-talk, Raman scattering etc.)

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
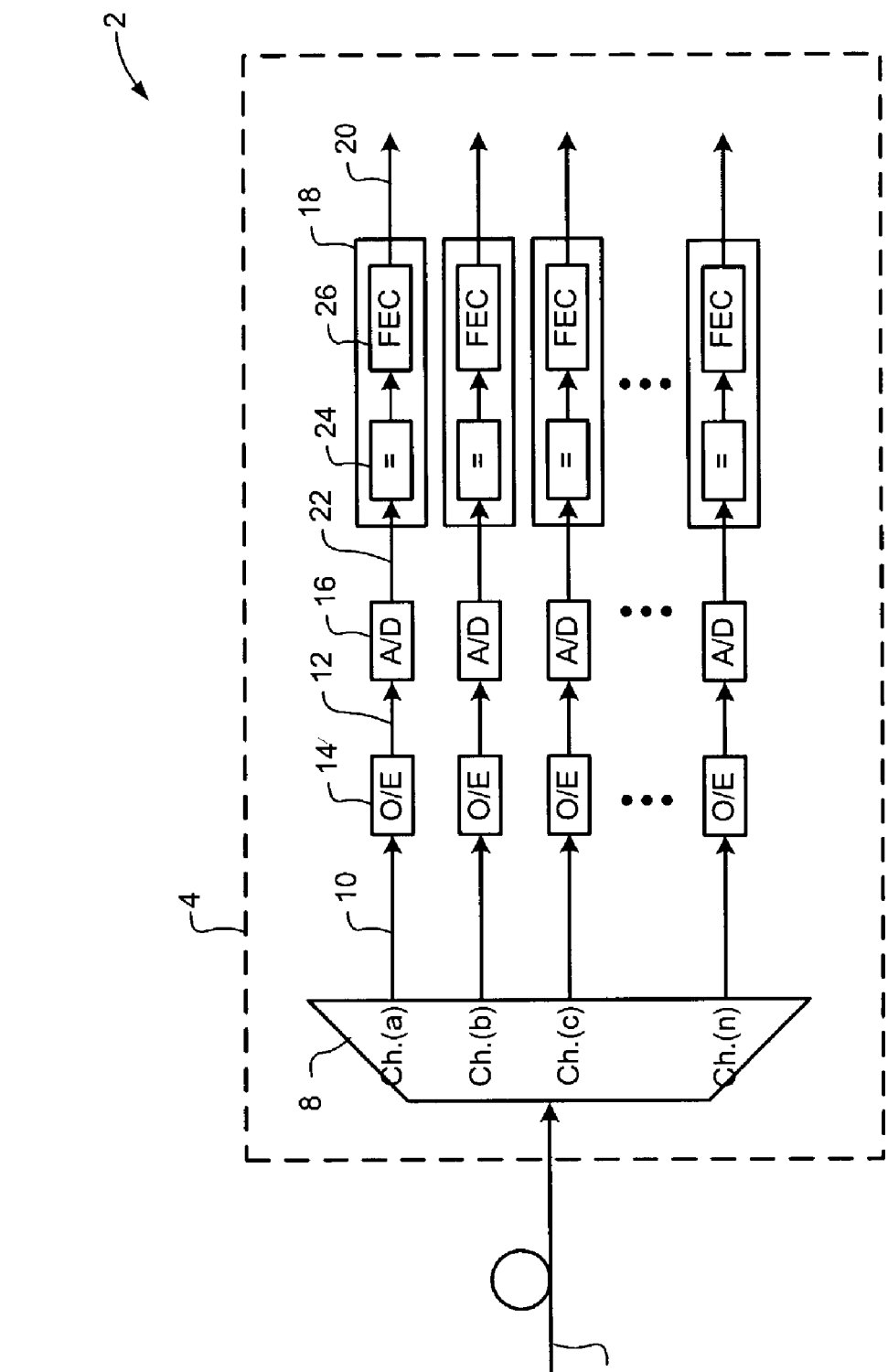
FIG. 1 is a block diagram schematically illustrating principle elements of a conventional optical communications system.

The present invention provides a method and system that enables effective performance monitoring of an optical communications system. FIG. 1 is a block diagram schematically illustrating principle elements of a conventional optical communications system in which the present invention may be deployed. Exemplary embodiments of the performance monitoring system in accordance with the present invention are illustrated in FIGS. 2-5.

As is well known in the art, modern optical communications systems typically convey both subscriber data signal traffic and administrative signaling. The subscriber data signal traffic is generally non-repeating, and is typically transported at the highest data rates supported by the communications system. Administrative signaling (such as, for example, status messages, channel identifiers and test probes) is typically low speed (e.g. on the order of 1 MHz or less), and may be repetitive. An important characteristic of the present invention is that performance monitoring of the communications system is accomplished by analyzing the subscriber data signal traffic, rather than low-rate administrative signaling. Accordingly, in the present application, references to; signal traffic, channels, channel signals, data streams, and the like shall be understood to refer to high-speed subscriber traffic.

As shown in FIG. 1, a conventional optical communications system 2 includes a node 4 which receives high bandwidth (e.g. on the order of 10 Giga-bits per second per channel, or more) optical subscriber signal traffic through an optical fiber 6. For the purposes of the present invention, the node 4 may be provisioned as any network element that performs optical-to-electrical conversion of the subscriber signal traffic received through the optical fiber 6. The communications system 2 shown in FIG. 1 is configured to receive Wave Division Multiplexed (WDM) subscriber signal traffic, which is optically de-multiplexed, for example using a conventional optical demultiplexer 8, to separate each of the individual optical channel signals 10. Each optical channel signal is then converted to a corresponding electrical channel signal 12 by a conventional optical-to-electrical (O/E) converter 14.

As is well known in the art, the amplitude of the electrical channel signal 12 generated by each O/E converter 14 is directly proportional to the optical power of the respective received optical channel signal 10. A high-speed Analog-to-Digital (A/D) converter 16 and a data decoder 18 are then used to detect and decode symbols within the electrical channel signal 12, and thereby generate a recovered digital data stream 20 that accurately reflects an original subscriber-originated digital data stream. Thus the A/D converter 16 samples the analog electrical channel signal 12 generated by the O/E converter 14 at a timing of a sample clock having a predetermined frequency $F_S$. The A/D converter 16 generates sequential N-bit (where $N \geq 1$) samples 22, each of which is indicative of an instantaneous value of the electrical channel signal 12. Typically, the value of N will be between 2 and 8, but may be as low as 1, or higher than 8, if desired. As is well known in the art, the frequency $F_S$ of the sample clock must be at least equal to the bit-rate of the channel signal 10, 12 in order to enable accurate detection and decoding of each symbol within the received electrical channel signal 12, and subsequent generation of the recovered digital data signal 20.

As is well known in the art, in some communications systems, each channel signal 10 is composed of a pair of orthogonally polarized optical modes. Digital data can be encoded into the channel signal using a variety of known encoding schemes, such as, for example, Differential Phase-Shift Keying (DPSK) and Quadrature Phase-Shift Keying (QPSK). In order to properly detect and decode symbols within each channel signal 10, the optical modes must be separated and independently detected. In such cases, the data path of each channel will normally include a number of O/E detectors 14 and A/D converters 16, so that each optical mode can be independently detected and sampled. For simplicity of illustration of the present invention, this duplication of the O/E detector 14 and A/D converter 16 is not shown in the drawings.

The data decoder 18 may be implemented in various ways to detect and decode symbols in the electrical channel signal 12. It will be appreciated that the data decoder 18 may be implemented in various ways well known in the art. In the illustrated embodiments, the data decoder 18 employs a digital equalizer 24 and a Forward Error Correction (FEC) circuit 26. Other known decoders may omit the equalizer 24 and/or utilize circuitry other than an FEC circuit 26 for generation of the recovered digital data stream 20. The digital equalizer 24 and FEC circuit 26 operate in a conventional manner to process each successive sample 22 generated by the A/D converter 16 to detect and decode each symbol of the electrical channel signal 12. As such, the recovered digital data stream 20 generated by the FEC circuit 26 will, within the error correction capabilities of the FEC circuit 26, accurately reflect the original digital data stream conveyed through the received optical channel signal 10.

Figure 2:
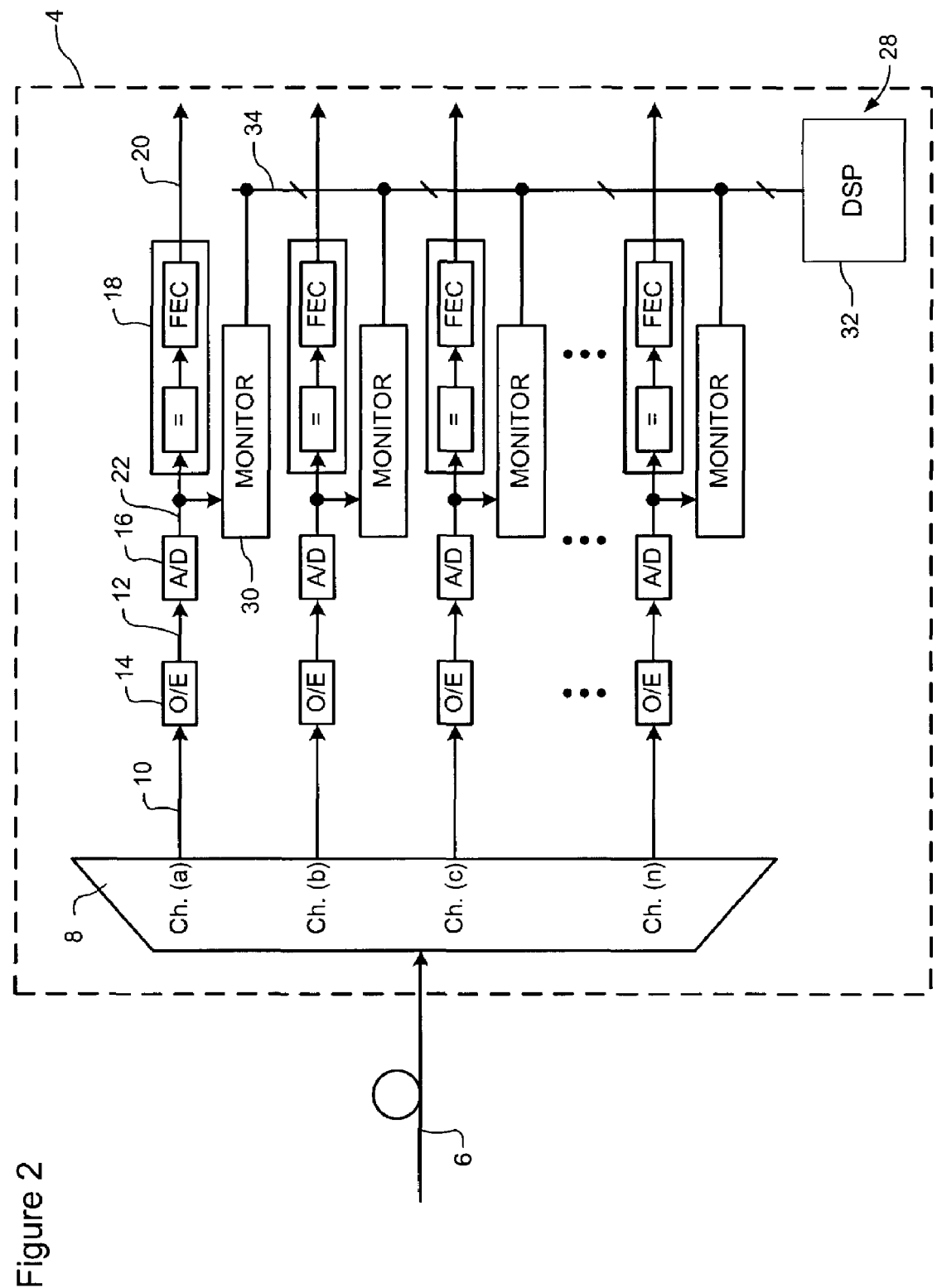
FIG. 2 is a block diagram schematically illustrating principle elements of a performance monitoring system in accordance with a first embodiment of the present invention.

As shown in FIG. 2, the performance monitoring system 28 of the present invention generally comprises a respective channel monitor 30 coupled to each channel of the communications system 2, and a digital signal processor 32 (DSP). Each channel monitor 30 is substantially identical, and operates to store at least sample data in the form of a set of sequential samples 22 generated by the channel's A/D converter 16. In systems having a more than one A/D converter 16 (e.g. for sampling respective mode signals) the sample data will normally contain corresponding sets of sequential samples 22 from each A/D converter 16 The DSP 32 may be co-located with one or more channel monitors (e.g. on a network interface card), or provisioned remote from the channel monitors (e.g. on a different card, a different shelf, or even a different site on the network) as desired. In either case, the DSP 32 is coupled to each channel monitor via a suitable data bus 34 or communications link to facilitate transfer of the sample data from each channel monitor 30 to the DSP 32. As will be described in greater detail below, the DSP 32 operates under control of suitable software to analyze the sample data to derive a wide variety of both per-channel and cross-channel signal analysis.

As may be appreciated, the architecture of the performance monitoring system 28 is substantially independent of the channel plan of the optical communications system 2. In particular, each channel monitor 30 is substantially identical, and operates independently of the other channel monitors 30. Sample data stored by each channel monitor 30 is transferred to the DSP 32 (e.g. under control of the DSP 32) which performs desired signal processing and analysis steps. Consequently, changes in the channel plan can readily be accommodated. The design and implementation of a suitable DSP 32 and data bus 34 structure capable of facilitating communication between the DSP 32 and a very large number of channel monitors 30 is well within the purview of those of ordinary skill in the art. Because each channel monitor 30 operates independently, the performance monitor system 28 is substantially insensitive to the wavelength separation between adjacent channels. Thus it will be appreciated that the present invention can be readily implemented on WDM communications systems having a flexible channel plan and/or bandwidths. Furthermore, the channels of the WDM communications system may have the same, or different, modulation of each channel. Principal elements and operations of a first embodiment of the channel monitor 30 will now be described with reference to FIG. 3.

Figure 3:
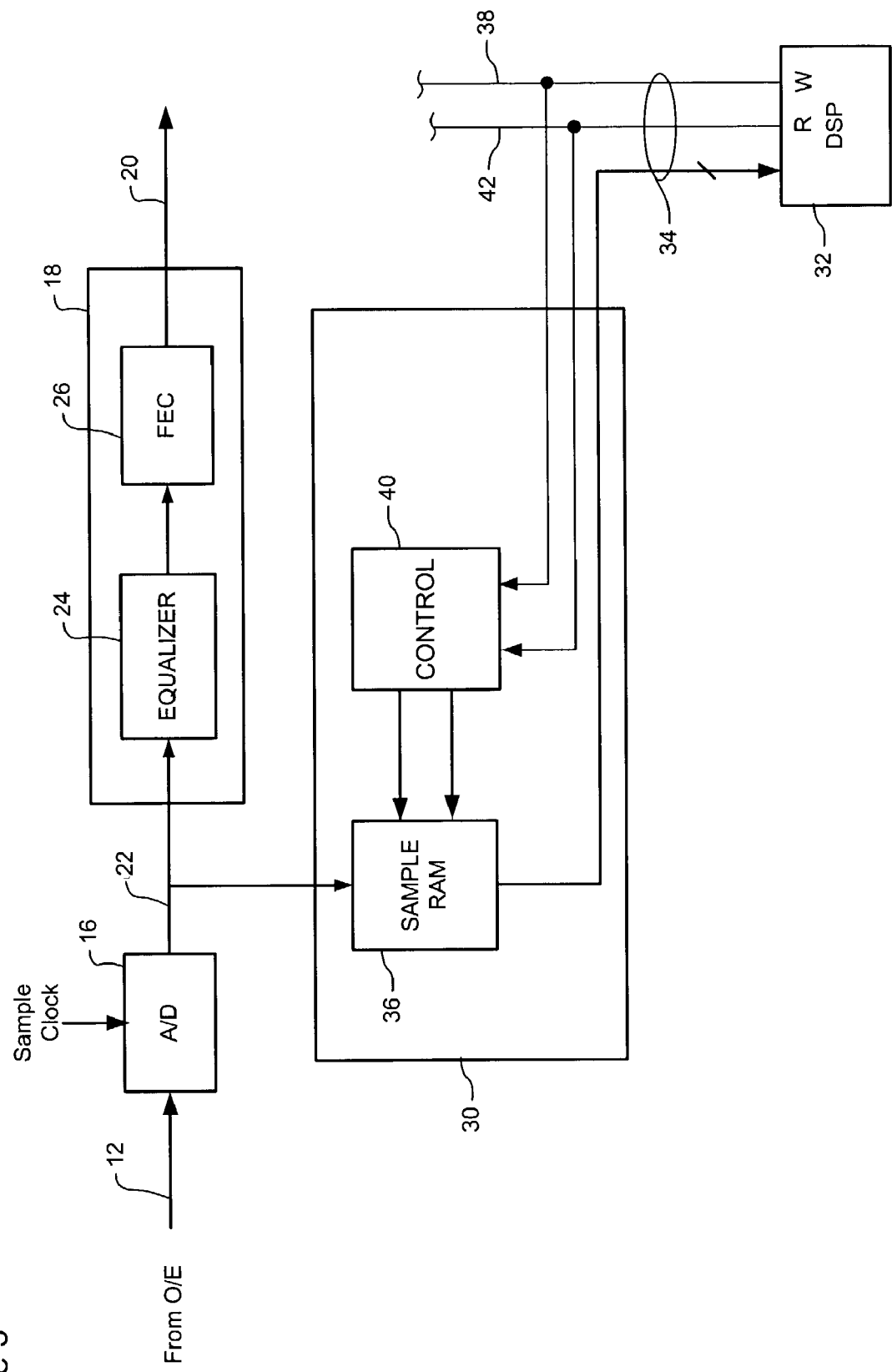
FIG. 3 is a block diagram schematically illustrating principle elements of a channel monitor usable in the performance monitoring system of FIG. 2.

As shown in FIG. 3, each channel monitor 30 comprises a sample memory 36 (which may be provided as a conventional random access memory—RAM) for storing sample data in the form of a set of sequential samples 22 generated by the A/D converter 16. The sample data can then be passed to the DSP 32 for processing, as will be described in greater detail below. Thus the channel monitor 30 utilizes the A/D converter 16 which operates normally to detect the electrical channel signal 12 at a timing of the sample clock. As such, the sample data stored in the sample memory 36 will directly reflect the state of the received electrical channel signal 12, and thus the performance of the respective optical channel. As an additional benefit, the "dual use" of the A/D converter 16 reduces the cost and complexity of implementing the performance monitoring system 28.

In general, the sample memory 36 may be of any arbitrary size. Preferably, the sample memory 36 will be sized to store samples 22 generated by the A/D converter 16 within a predetermined interval of time (such as, for example, in the range of a few tens of microseconds to milliseconds) and/or encompassing a predetermined number of samples 22, or a predetermined number of data bits generated by the FEC circuit 26. Samples 22 may be stored continuously, so that the sample memory 36 always contains the most recently generated samples 22. Preferably, however, the storage operation is controlled by a "write" signal 38 generated by the DSP. For example, the channel monitor 30 may be provided with a controller 40 which is responsive to the "write" signal 38 to flush the contents of the sample memory 36, and then store a predetermined number of successive samples 22 generated by the A/D converter 16. This arrangement has the advantage that the DSP 32 can simultaneously control the storage of sample data in every channel monitor 30 of a multi-channel system. By properly accounting for propagation delay of the "write" signal 38 between the DSP 32 and each of the channel monitors 30, it is possible to ensure that the storage operation is executed substantially simultaneously across all of the channels of the optical communications system 2. As a result, the sample data stored by all of the channel monitors 30*a-n* will accurately represent a "snap shot" of the state of the optical communications system 2 during the involved time interval. As may be appreciated, the simultaneous storage of sample data across all of the, channels of the optical communications system 2 facilitates correlation of sample data from each channel monitor, and thus highly accurate analysis of cross-channel effects such as, for example, cross-talk between adjacent channels.

In general, at least some differences in the timing of the storage operation within each channel monitor 30 must be expected. That is, precise simultaneity across all of the channel monitors 30 will not be achieved. However, provided that there is at least some overlap in the timing of the storage operation, then sample data from different channel monitors can be correlated (at least to the extent that the degree of overlap permits) and cross-channel effects analyzed. The minimum tolerable degree of overlap will generally depend on the minimum amount of signal correlation required to analyze a desired cross-channel effect.

The transfer of sample data to the digital signal processor (DSP) 32 can conveniently be controlled by a "read" signal 42 generated by the DSP 32. This arrangement enables respective sample data from each of multiple channel monitors 30 to be transferred to the DSP 32 for further analysis. Synchronized storage of sample data within the sample memory 36 of each channel monitor 30 allows indexing of the samples 22 so that the transfer of sample data to the DSP 32 does not need to be real-time. Because each channel monitor 30 stores samples 22 representing a substantially simultaneous time intervals across all channels of the optical communications system 2, information can be transferred from each channel monitor 30, in turn, without loss of correlation between samples 22 stored by each of the channel monitors 30.

As may be appreciated, the accuracy with which the DSP 32 can calculate performance parameters of the communications system 2 is dependent on the degree to which the sample data stored by each channel monitor 30 reflects its respective electrical channel signal 12. This, in turn, will be dependent on the resolution of the A/D converter 16, and the sample frequency $F_S$ of the sample clock. Clearly, increasing the resolution of the A/D converter 16 (e.g. using an 8-bit converter as opposed to a 2 or 4-bit converter) increases precision of each sample 22. However, this increased precision is obtained at a cost of increased expense and complexity.

Accurate detection and decoding of symbols within the electrical channel signal 12 requires that the sample frequency $F_s$ of the sample clock must be at least equal to the data rate of the channel signal 10, 12. Increasing $F_S$ beyond this data rate increases the degree to which the sample data stored by each channel monitor 30 reflects its respective electrical channel signal 12, and so enables calculation of performance parameters with increased accuracy. A sample frequency $F_S$ of at least twice the bandwidth of the channel signal 10, 12 satisfies Nyquist's theorem, with the result that the sample data stored in the sample memory 36 will contain sufficient information to enable the DSP 32 to completely reconstruct the electrical channel signal 12 received during the involved time interval. This has the advantage of enabling very detailed signal analysis to be performed by the DSP 32, but again, at a cost in increased cost and complexity of the A/D converter 16 and sample memory 36 to accommodate the required data processing rate.

Figure 4:
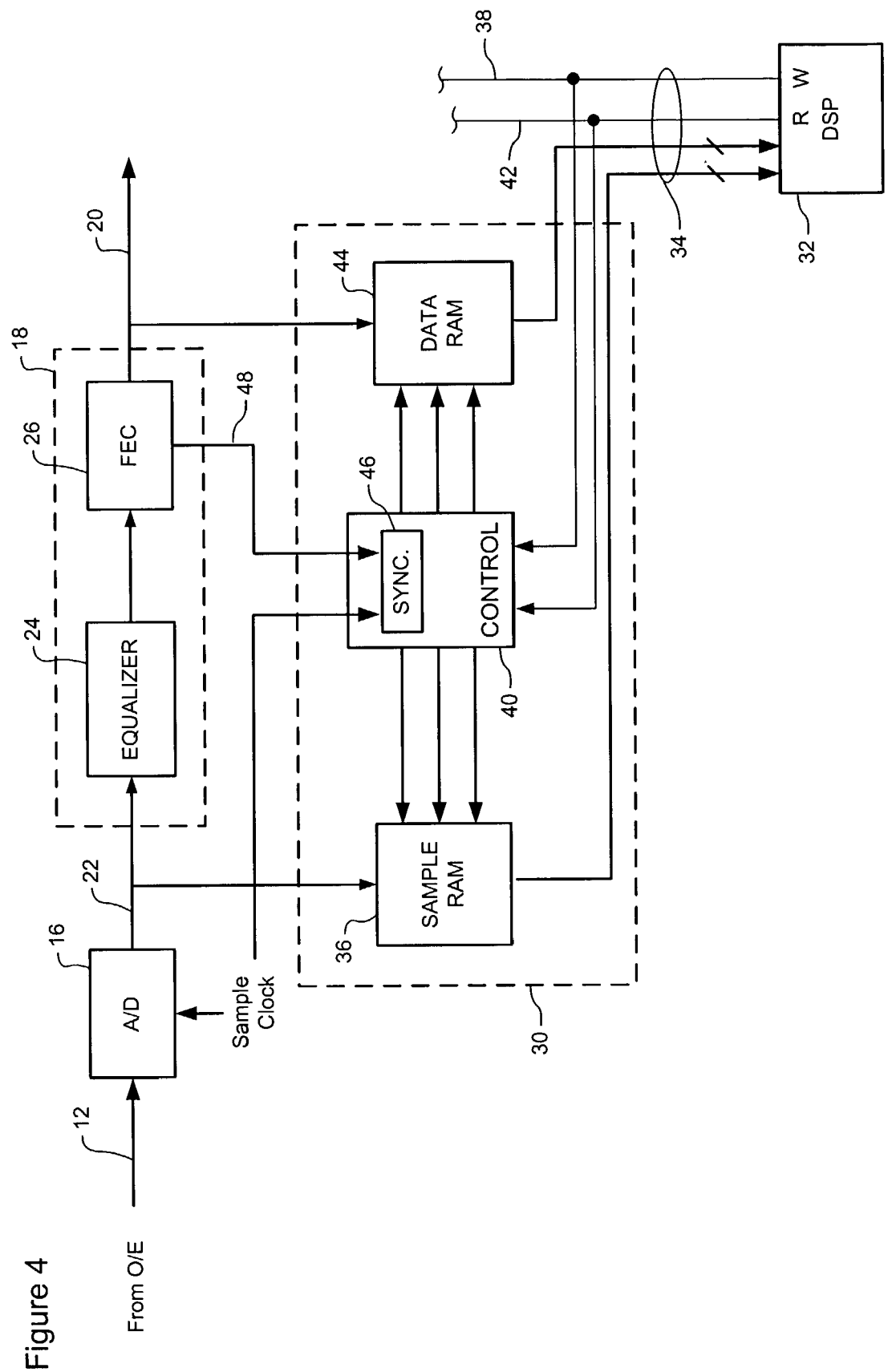
FIG. 4 is a block diagram schematically illustrating a second embodiment of a channel monitor.

FIG. 4 is a block diagram showing a second embodiment of the channel monitor 30, which also includes a data memory 44 (which may also be provided as a conventional RAM) for storing sequential bits of the recovered digital data stream generated by the decoder circuit 18. The storage of both sample data 22 and recovered digital data 20 is preferable, in that it greatly increases the range of analysis that can be performed by the DSP 32, without an undue increase in cost or complexity. As with the A/D converter 16, the channel monitor 30 exploits a "dual use" for the decoder circuit 18 already present as part of the data path of the network node 4, and thereby reduces the cost of implementing the performance monitoring system 28.

In the embodiment of FIG. 4, the sample memory 36 is coupled to the A/D converter 16 as described above in order to store successive N-bit samples 32 generated by the A/D converter 16. Similarly, the data memory 44 is coupled to the output of the FEC circuit 26 in order to store successive data bits of the recovered digital data stream 20. Because the physical characteristics of the A/D converter 16 and the decoder circuit 18 are well characterized, it is possible to control the storage operation such that each data bit saved in the data memory 44 is properly associated with its corresponding sample 22 (or samples) stored in the sample memory 36. In the illustrated embodiment, this functionality is implemented by means of a synchronization circuit 46 which operates on the basis of a trigger signal 48 generated by the FEC circuit 26 (and indicative of the timing of each corrected bit generated by the FEC circuit 26), in combination with the known propagation delay between the A/D converter 16 and the output of the FEC circuit 26.

In general, the sample and data memories 36 and 44 may be of any arbitrary size. Preferably, each of these memories 36, 44 will be sized to store corresponding samples and corrected bits 20 within the involved interval of time (such as, for example, in the range of a few tens of microseconds to milliseconds), and/or encompassing a predetermined number of samples 22 or corrected data bits generated by the FEC circuit 26. Samples 22 and corrected bits 20 may be stored continuously, so that the sample and data memories 36 and 44 always contain up-to-date information. Preferably, however, the storage operation is controlled by the "write" signal 38 generated by the DSP 32, as described above with the reference to FIG. 3. The channel monitor may be responsive to the "write" signal to flush the contents of each of the sample and data memories, and then store a predetermined number of corrected data bits and corresponding samples. Thus, the DSP can simultaneously control the storage of information in every channel monitor 30 across all of the channels of the optical communications system 2. As will be appreciated, the simultaneous storage of (correlated) sample and corrected bits within each channel of the optical communications system facilitates highly accurate analysis of cross-channel effects such as, for example, cross talk between adjacent channels.

The transfer of samples and corrected bits to the digital signal processor 32 can conveniently be controlled by a "read" signal 42 generated by the DSP 32 as described above with reference to FIG. 3.

If desired, the channel monitor 30 can also be configured (e.g. by means of a suitable memory and connections) to store and transfer various operating parameters of the A/D converter 16 and decoder 18 to the DSP 32 along with the samples and corrected bits. Exemplary operating parameters may include: threshold levels and sample clock phase used by the A/D converter 16 to generate the samples; and equalizer settings used to control operation of the digital equalizer 24.

Figure 5A:
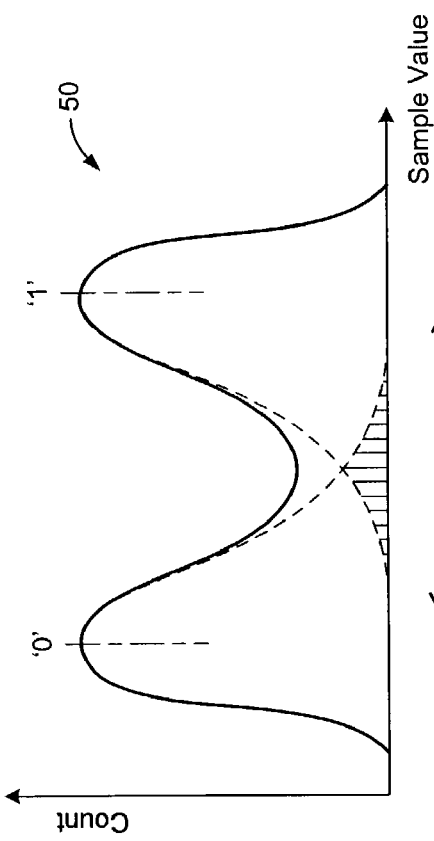
FIGS. 5*a-c* schematically illustrate separation of an optical power histogram into respective histograms for binary "0" and binary "1" bits of a received optical signal, in accordance with an embodiment of the present invention.

As may be appreciated, the storage and transfer of correlated samples 22 and corrected bits 20 for each channel facilitates a wide range of sophisticated signal analysis operations to be performed for each respective channel. For example, FIG. 5A shows an exemplary histogram 50 for on-off-keying (OOK) encoded data, which is derived from samples 22 stored in the sample memory 36 of a channel monitor 30. As may be seen in FIG. 5A, the histogram 50 shows the clustering of samples 22 around a high value representing a binary "1", and a low value representing a binary "0". Sample values within each of these clusters are unambiguous, in that a simple threshold comparison accurately reproduces the correct data bits. Samples lying between these two clusters are ambiguous and tend to generate errored bits that must be corrected by the FEC circuit 26.

Figure 5C:
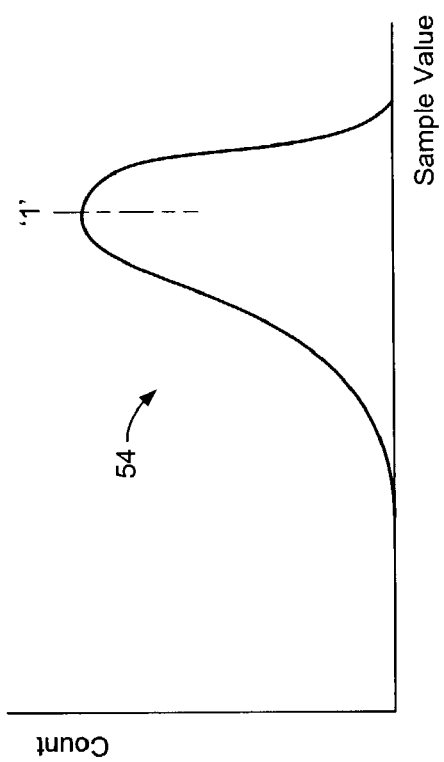
Figure 5B:
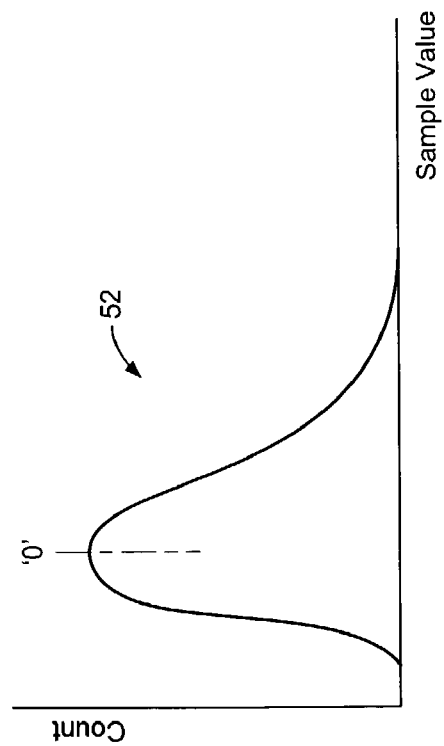

In general, the distance between the respective means of the two clusters is indicative of the eye opening, while the width of each cluster (which may be represented by the variance or standard deviation, as desired) is indicative of signal noise. As may be appreciated, the samples 22 stored in the sample memory 36 of the channel monitor 30 readily facilitates generation and analysis of the histogram of FIG. 5A, and therefore calculation of eye opening, signal noise, and other relevant characteristics of the respective optical channel. This operation can be performed equally in the embodiments of FIGS. 3 and 4. In the embodiment of FIG. 4, the samples 22 stored in the sample memory 36 are also unambiguously correlated to respective correct data bits 20 (generated by the FEC circuit 26). In this case, it is possible to separate the histogram of FIG. 5A into respective histograms 52, 54 for binary "0" bits and binary "1" bits, as shown in FIGS. 5b and 5c, respectively.

As mentioned previously, the A/D converter 16 samples the received channel signal at a time of the sample clock. In a simple embodiment of the invention, the sample clock is generated by a clock-recovery circuit (not shown), and is frequency-locked with the received channel signal. The phase of the sample clock is preferably adjusted so that the timing of each sample 22 coincides with the expected center of each symbol within the electrical channel signal 12. This arrangement has the advantage that timing each sample 22 to coincide with each received symbol improves the accuracy of decoding and data recovery, as well as correlation between samples 22 and corrected data bits 20.

As is well known in the art, each sample 22 will normally be correlated with more than one symbol within the received electrical channel signal 12, which produces inter-symbol interference (ISI). The digital equalizer 24 processes each sample 22 in order to correct the ISI, and the processed sample supplied to the FEC circuit 26, which generates the corrected data bits. Both the sample 22 and the corrected data bits 20 are stored for further processing by the DSP 32, as described above. This arrangement provides an M-to-one (where $M \geq 1$) correlation between samples and corrected bits, which facilitates a wide range of per-channel signal analysis by the DSP.

Alternatively, the sample clock can be a free-running clock having a frequency greater than the data rate of the received electrical channel signal 12. In this case, the A/D converter 16 will generate more than one sample 22 for each symbol within the received channel signal, and the timing of each sample 22 will, in general, not coincide with the center of each symbol. According to Nyquist's theorem, if the frequency of the sample clock is selected so that the A/D converter 16 samples the received channel signal at a sample rate $F_S$ of at least twice the bandwidth of the electrical channel signal 12, then the samples 22 stored in the sample memory will contain sufficient information to enable the DSP 32 to completely reconstruct the electrical channel signal 12. As in the simplified embodiment described above, the digital equalizer 24 processes each sample 22 in order to correct ISI, and the processed samples supplied to the FEC circuit 26, which generates the corrected data bit. Both the corrected data bit and the corresponding samples 22 are stored for further processing by the DSP 32, as described above. This latter arrangement implies an M-to-one (where $M \geq 2$) correlation between samples 22 and corrected bits stored in the sample and data memories 36 and 44.

As may be appreciated, reconstruction of the electrical channel signal 12 enables a more extensive range of per-channel analysis to be implemented by the DSP 32. For example, a noise spectrum within the respective channel can be detected and characterized.

In either of the above embodiments, changes in the electrical channel signal 12 (e.g. between successive time intervals) can be detected. This information can be used to detect changes in the state of the optical communications system 2 and/or determine the sensitivity of the electrical channel signal 12 to changes in control parameters used for controlling the optical communications system 2. Both of these results can be used to optimize the performance of the optical communications system 2.

Because respective sets of samples 22 are simultaneously stored by each channel monitor 30, the respective channel signals reconstructed by the DSP 32 will be time-correlated. This enables the DSP 32 to compare the signals within respective different channels to evaluate various cross-channel effects. Exemplary analysis that may be performed by the DSP 32 include (but are not limited to):

a) Linear cross-talk between neighboring channels can be measured by correlation of the respective stored sample data. This information can then be used to evaluate (and/or optimize) performance of the optical demultiplexer, for example.

b) A known dither can be impressed on, for example, a selected optical channel signal or a pump laser at a point up-stream of the performance monitoring system 28. The DSP 32 can use the known dither to evaluate Raman scattering effects, and this information may be used to optimize performance of pump lasers within the optical communications system.

c) Four-wave mixing cross-talk can be evaluated by correlating the product of two (or three) signals (as represented by the sample data stored by a pair of channel monitors 30) with a signal measured by a third (or fourth) channel monitor 30.

d) The location in time of bit errors and the bit error rate can be calculated for each channel the FEC circuit. The location and/or rate of errors can be correlated with the presence or strength of certain phenomena, e.g. four wave mixing.

e) Comparison between the samples and data bits stored by a channel monitor 30 can also be used to identify errored symbols within the electrical channel signal 12. These errored symbols can be correlated, in time, to identify error patterns. These error patterns may be used to identify defective components or other sources of error. They may also be used to identify effects of dispersion, polarization mode dispersion (PMD) and/or polarization dependent loss (PDL).

f) Equalizer settings may be used to determine dispersion, polarization mode dispersion (PMD) and/or polarization dependent loss (PDL).

g) In systems in which the sample data satisfies Nyquist's theorem, the reconstructed channel signal can be analyzed to detect phase jitter. Correlation between the detected phase jitter and the reconstructed signal of the same and other channels can be used to identify self phase modulation (SPM) and cross-phase modulation (XPM), respectively.

The embodiments of the invention described above are intended to be exemplary only. The scope of the invention is therefore intended to be limited solely by the scope of the appended claims.

We claim:

1. A method of monitoring performance of an optical communications system having a data path including an Analog-to-Digital (A/D) converter operatively coupled to a data decoder for generating a recovered data stream corresponding to subscriber digital data encoded within a respective channel signal, the method comprising steps of:

tapping the data path between the A/D converter and the data decoder to obtain sample data generated by the A/D converter within a predetermined time interval, the sample data comprising sequential N-bit samples (where $N \geq 1$) respectively indicative of a detected analog value of the channel signal; and calculating at least one performance parameter of the optical communications system based on the sample data, independently of the data path.

2. A method as claimed in claim 1, wherein the predetermined time interval corresponds with any one of a selected number of symbols conveyed by the channel signal;

a selected number of samples generated by the A/D converter; and a selected number of bits of the recovered data stream generated by the data decoder.

3. A method as claimed in claim 2, wherein respective time intervals in which sample data is obtained from first and second data paths of the optical communications system at least partially overlap in time.

4. A method as claimed in claim 3, wherein the respective time intervals are substantially simultaneous.

5. A method as claimed in claim 3, wherein the step of calculating at least one performance parameter comprises steps of:

identifying a period during which the respective time intervals overlap; and correlating respective sample data obtained from each data path during the identified overlap period.

6. A method as claimed in claim 1, further comprising a step of tapping the data path to obtain decoded data bits of the recovered data stream generated by the data decoder using the sample data.

7. A method as claimed in claim 6, further comprising a step of compensating a delay between generation of a sample by the A/D converter and generation of a corresponding decoded data bit by the data decoder.

8. A method as claimed in claim 7, wherein the step of calculating at least one performance parameter comprises a step of correlating each decoded data bit with at least one sample of the sample data used to generate the decoded data bit.

9. A method as claimed in claim 8, further comprising a step of identifying errored symbols within the channel signal, based on the correlation between the decoded data bits and the sample data.

10. A method as claimed in claim 1, further comprising a step of controlling a sample rate of the A/D converter such that the sample data satisfies Nyquist's theorem.

11. A method as claimed in claim 10, wherein the step of calculating at least one performance parameter comprises a step of reconstructing a portion of the channel signal received by the A/D converter during the predetermined time interval, based on the sample data.

12. A method as claimed in claim 11, further comprising a step of correlating first and second reconstructed portions of the channel signal received during respective first and second time intervals.

13. A digital performance monitoring system for an optical communications system having a data path including an Analog-to-Digital (A/D) converter operatively coupled to a data decoder for generating a recovered data stream corresponding to subscriber digital data encoded within a respective channel signal, the digital performance monitoring system comprising:

a channel monitor adapted to tap the data path between the A/D converter and the data decoder to obtain sample data generated by the A/D converter within a predetermined time interval, the sample data comprising sequential N-bit samples (where $N \geqq 1$) respectively indicative of a detected analog value of the channel signal; and a signal processor (DSP) adapted to calculate at least one performance parameter of the optical communications system based on the sample data, independently of the data path.

14. A system as claimed in claim 13, wherein the predetermined time interval corresponds with any one of:

a selected number of symbols conveyed by the channel signal;

a selected number of samples generated by the A/D converter; and a selected number of bits of the recovered data stream generated by the data decoder.

15. A system as claimed in claim 14, wherein respective time intervals in which sample data is obtained from first and second data paths of the optical communications system at least partially overlap in time.

16. A system as claimed in claim 15, wherein the respective time intervals are substantially simultaneous.

17. A system as claimed in claim 13, wherein the channel monitor comprises:

a sample memory adapted to receive successive samples from the A/D converter; and a controller adapted to control the sample memory to store samples received during the predetermined time interval.

18. A system as claimed in claim 17, wherein the controller is responsive to a "write" signal from the signal processor to control storage of samples in the sample memory.

19. A system as claimed in claim 17, wherein the controller is responsive to a "read" signal from the signal processor to control transmission of stored sample data from the sample memory to the signal processor.

20. A system as claimed in claim 17, wherein the channel monitor further comprises a data memory adapted to store decoded data bits of the recovered data stream generated by the data decoder using the sample data.

21. A system as claimed in claim 20, wherein the controller is adapted to compensate a delay between generation of a sample by the A/D converter and generation of a corresponding corrected data bit by the decoder, whereby each stored corrected data bit is correlated with at least one sample used to generate the corrected data bit.

22. A system as claimed in claim 20, wherein the controller is adapted to control storage of the sample data in response to a "write" signal generated by the digital signal processor.

23. A system as claimed in claim 22, further comprising a data bus adapted to simultaneously convey the "write" signal from the digital signal processor to each one of a plurality of parallel channel monitors, such that respective sample data is stored by each of the channel monitors within respective time intervals that at least partially overlap in time.

* * * * *